(12) United States Patent
Ma et al.

(10) Patent No.: US 11,579,613 B2
(45) Date of Patent: Feb. 14, 2023

(54) METHOD AND APPARATUS FOR POSITIONING A ROBOT AT START-UP, ELECTRONIC DEVICE AND STORAGE MEDIUM

(71) Applicant: Keenon Robotics Co., Ltd., Shanghai (CN)

(72) Inventors: Shuai Ma, Shanghai (CN); Wenfei Zhao, Shanghai (CN); Xue Bai, Shanghai (CN); Yingxuan Li, Shanghai (CN)

(73) Assignee: Keenon Robotics Co., Ltd., Shanghai (CN)

( * ) Notice: Subject to any disclaimer, the term of this patent is extended or adjusted under 35 U.S.C. 154(b) by 141 days.

(21) Appl. No.: 17/233,117

(22) Filed: Apr. 16, 2021

(65) Prior Publication Data

US 2022/0026908 A1    Jan. 27, 2022

(30) Foreign Application Priority Data

Jul. 22, 2020   (CN) .......................... 202010707955.6

(51) Int. Cl.
*G05D 1/02*    (2020.01)
*G01S 5/14*    (2006.01)
(Continued)

(52) U.S. Cl.
CPC ............. *G05D 1/0212* (2013.01); *G01S 5/14* (2013.01); *G01S 5/30* (2013.01); *H04W 4/025* (2013.01)

(58) Field of Classification Search
CPC ...... G05D 1/0212; G05D 1/0261; G01S 5/14; G01S 5/30; G01S 5/0284; G01S 2205/01;
(Continued)

(56) References Cited

U.S. PATENT DOCUMENTS

2019/0339714 A1    11/2019   Kwak et al.

FOREIGN PATENT DOCUMENTS

CN    104267725 A    9/2014
CN    105116378 A    9/2015
(Continued)

OTHER PUBLICATIONS

Office Action issued in corresponding Chinese Patent Application No. 202010707955.6 (with English Translation) dated Jun. 26, 2022, 19 pages.

*Primary Examiner* — Robert T Nguyen
*Assistant Examiner* — Renee LaRose
(74) *Attorney, Agent, or Firm* — Klarquist Sparkman, LLP

(57) ABSTRACT

A method for positioning a robot at start-up includes: when the robot is started up, controlling the robot to rotate in a preset rotation direction in a start-up positioning region; determining position information about a rotation path of the positioning transmitting unit according to the preset rotation direction and a set of at least three different position distances, where the at least three different position distances are between the positioning transmitting unit and the two positioning receiving units disposed at the different fixed positions and are determined during a rotation process; using a direction extending from the center position of the rotation path to a position of the positioning transmitting unit when the robot stops rotation as orientation information of the robot; and using the center position of the rotation path and the orientation information of the robot as start-up positioning information of the robot.

17 Claims, 6 Drawing Sheets

(51) Int. Cl.
*G01S 5/30* (2006.01)
*H04W 4/02* (2018.01)

(58) Field of Classification Search
CPC ............ G01S 5/02; G01S 5/0247; G01S 5/06;
H04W 4/025; H04W 4/023; H04W 64/00
See application file for complete search history.

(56) References Cited

FOREIGN PATENT DOCUMENTS

| | | | |
|---|---|---|---|
| CN | 106227214 | A | 8/2016 |
| CN | 106530352 | A | 10/2016 |
| CN | 106990776 | A | 2/2017 |
| CN | 109031205 | A | 7/2018 |
| CN | 109307857 | A | 2/2019 |
| CN | 109480715 | A | 3/2019 |

METHOD AND APPARATUS FOR POSITIONING A ROBOT AT START-UP, ELECTRONIC DEVICE AND STORAGE MEDIUM

CROSS-REFERENCES TO RELATED APPLICATIONS

This application claims priority to a Chinese patent application No. 202010707955.6 filed on Jul. 22, 2020, the disclosure of which is incorporated herein by reference in its entirety.

TECHNICAL FIELD

The embodiments of the present disclosure relate to the technical field of robot positioning, and in particular to a method and apparatus for positioning a robot at start-up, an electronic device and a storage medium.

BACKGROUND

With the development of positioning technologies, current robots can achieve autonomous positioning and navigation based on their own positioning systems. When a robot is turned on and started up, the robot will lose its own positioning information and thus lose the ability of autonomous navigation.

In the related art, a robot usually acquires position information of the robot again by constructing a map through visual information. In such method, a start-up reposition database of the robot needs to be constructed based on acquired pose data and image data, a start-up image when the robot is at a start-up position needs to be acquired, a plurality of similar images matching the start-up image are obtained from the start-up reposition database, and the start-up pose of the robot at the start-up position is determined based on the similar images.

However, the preceding method is greatly affected by the environment. Thus, the positioning accuracy of the robot at start-up will be greatly affected after certain changes occur in the surrounding environment of the robot.

SUMMARY

The present disclosure provides a method and apparatus for positioning a robot at start-up, an electronic device and a storage medium to improve the positioning accuracy of a robot at start-up.

In a first aspect, the embodiments of the present disclosure provide a method for positioning a robot at start-up, and the method is executed by a controller in a system for positioning a robot at start-up. The system for positioning a robot at start-up includes two positioning receiving units disposed at different fixed positions and an positioning transmitting unit disposed on the robot. The positioning transmitting unit is in communication connection with the positioning receiving units and is configured to send positioning signals to the positioning receiving units. The method includes steps described below.

When the robot is started up, the robot is controlled to rotate in a preset rotation direction in a start-up positioning region.

Position information about a rotation path of the positioning transmitting unit is determined according to the preset rotation direction and a set of at least three different position distances, where the at least three different position distances are between the positioning transmitting unit and the two positioning receiving units disposed at the different fixed positions and are determined during a rotation process.

A center position of the rotation path is determined according to the position information about the rotation path of the positioning transmitting unit.

A direction extending from the center position of the rotation path to a position of the positioning transmitting unit when the robot stops rotation is used as orientation information of the robot.

The center position of the rotation path and the orientation information of the robot are used as start-up positioning information of the robot.

In a second aspect, the embodiments of the present disclosure further provide an apparatus for positioning a robot at start-up, the apparatus being configured in a controller of a system for positioning a robot at start-up. The system for positioning a robot at start-up includes two positioning receiving units disposed at different fixed positions and a positioning transmitting unit disposed on the robot. The positioning transmitting unit is in communication connection with the positioning receiving units and is configured to transmit positioning signals to the positioning receiving units. The apparatus includes a rotation module, a path information determination module, a center position determination module, an orientation information determination module and a positioning information determination module.

The rotation module is configured to: when the robot is started up, control the robot to rotate in a preset rotation direction in a start-up positioning region.

The path information determination module is configured to determine position information about a rotation path of the positioning transmitting unit according to the preset rotation direction and a set of at least three different position distances, where the at least three different position distances are between the positioning transmitting unit and the two positioning receiving units disposed at the different fixed positions and are determined during a rotation process.

The center position determination module is configured to determine a center position of the rotation path according to the position information about the rotation path of the positioning transmitting unit.

The orientation information determination module is configured to use a direction extending from the center position of the rotation path to a position of the positioning transmitting unit when the robot stops rotation as orientation information of the robot.

The positioning information determination module is configured to use the center position of the rotation path and the orientation information of the robot as start-up positioning information of the robot.

In a third aspect, the embodiments of the present disclosure further provide an electronic device. The electronic device includes one or more processors and a storage apparatus.

The storage apparatus is configured to store one or more programs.

The one or more programs, when executed by the one or more processors, cause the one or more processors to implement the method for positioning a robot at start-up of any one of the embodiments of the present disclosure.

In a fourth aspect, the embodiments of the present disclosure further provide a computer-readable storage medium, having a computer program stored thereon, where the computer program, when executed by a processor, cause the processor to perform the method for positioning a robot at start-up of any one of the embodiments of the present disclosure.

According to the method for positioning a robot at start-up provided in the embodiments of the present disclosure, when the robot is started up, the robot is controlled to rotate in a preset rotation direction in a start-up positioning region; then position information about a rotation path of the positioning transmitting unit is determined according to the preset rotation direction and a set of distances, where the distances are between the positioning transmitting unit and the two positioning receiving units disposed at the different fixed positions and are determined during a rotation process; a direction extending from the center position of the rotation path to a position of the positioning transmitting unit when the robot stops rotation is used as orientation information of the robot; and the center position of the rotation path and the orientation information of the robot are used as start-up positioning information of the robot. Compared with the related art, the provided technical solution avoids the interference and influence of obstacles in the external dynamic environment and improves the accuracy of positioning information at start-up.

DETAILED DESCRIPTION

Figure 1:
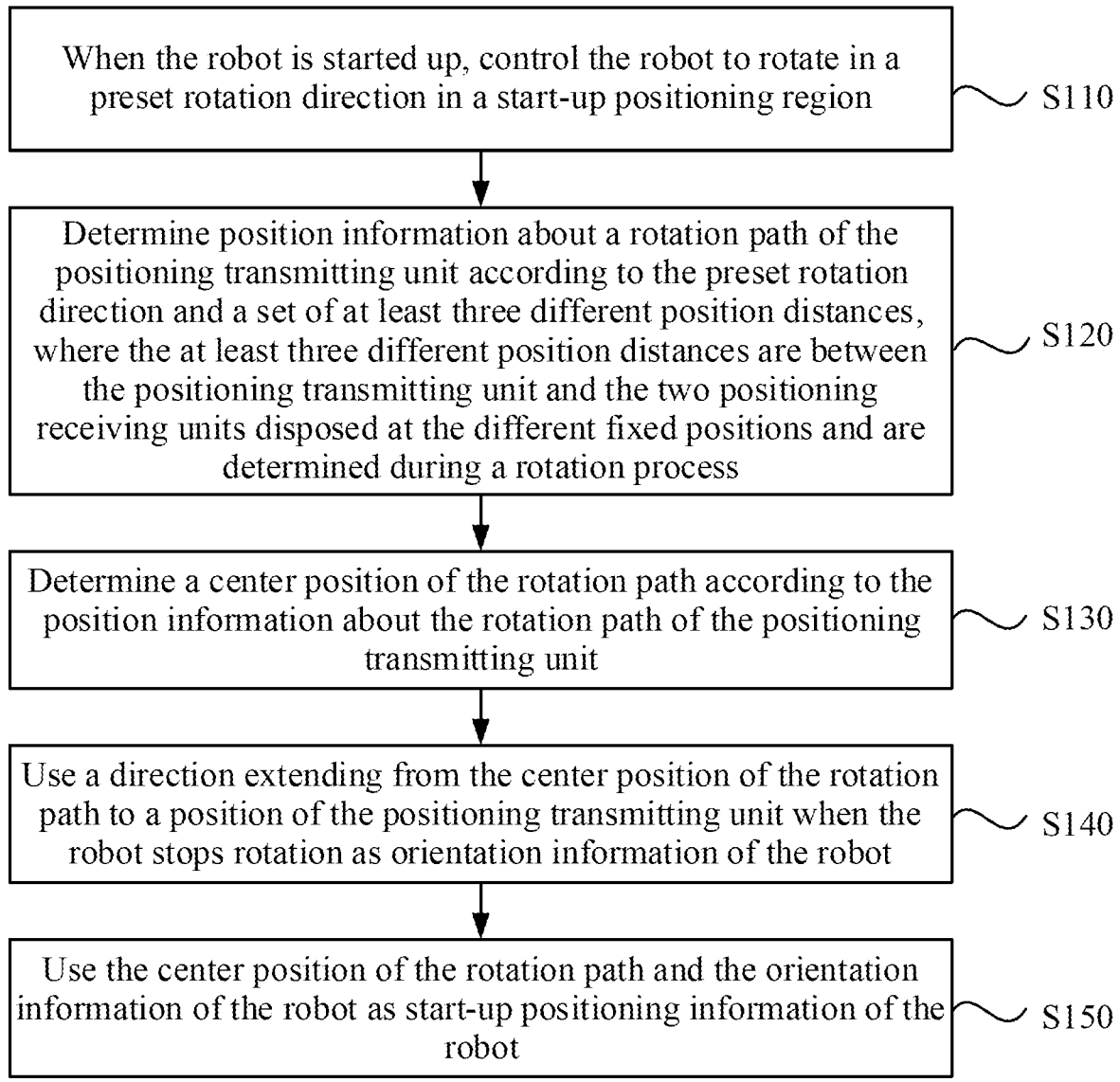
FIG. 1 is a flowchart of a method for positioning a robot at start-up according to embodiment one of the present disclosure.

The present disclosure is further described below in detail in conjunction with drawings and embodiments. It is to be understood that the embodiments described herein are merely intended to explain the present disclosure and not to limit the present disclosure. Additionally, it is to be noted that for ease of description, merely part, not all, of the structures related to the present disclosure are illustrated in the drawings.

Embodiment One

FIG. 1 is a flowchart of a method for positioning a robot at start-up according to embodiment one of the present disclosure. The embodiment is applicable to a case of positioning a robot when the robot is turned on and started up. The method may be performed by a controller in a system for positioning a robot at start-up. The system for positioning a robot at start-up includes positioning receiving units disposed at fixed positions and a positioning transmitting unit disposed on the robot. The positioning transmitting unit is in communication connection with the positioning receiving units and is configured to send positioning signals to the positioning receiving units.

The positioning receiving units and the positioning transmitting unit perform positioning in a manner which may include, but is not limited to, wireless fidelity (WiFi), Bluetooth, infrared, ultra wide band (UWB), radio frequency identification (RFID), ultrasonic and the like. In the embodiment, the positioning transmitting unit disposed on the robot transmits positioning signals at a certain frequency, and the positioning receiving units disposed at fixed positions continuously receive the positioning signals transmitted by the positioning transmitting unit, so that the information about relative distances between the positioning transmitting unit and the positioning receiving units can be calculated according to the positioning signals returned by the positioning receiving units.

Figure 2:
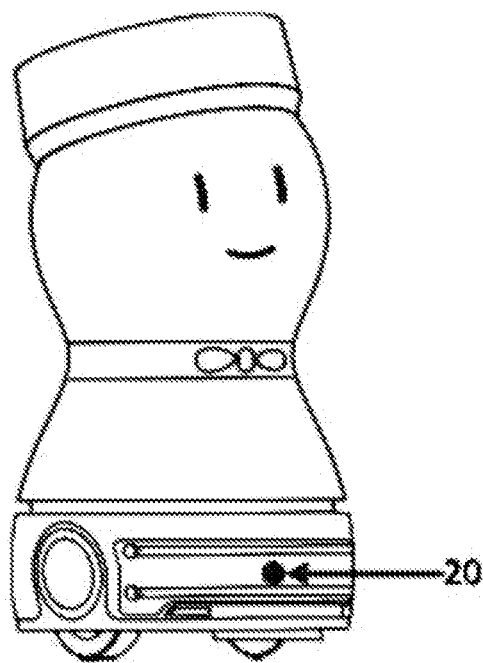
FIG. 2 is a schematic diagram of an installation position of a positioning transmitting unit according to embodiment one of the present disclosure.
Figure 3:
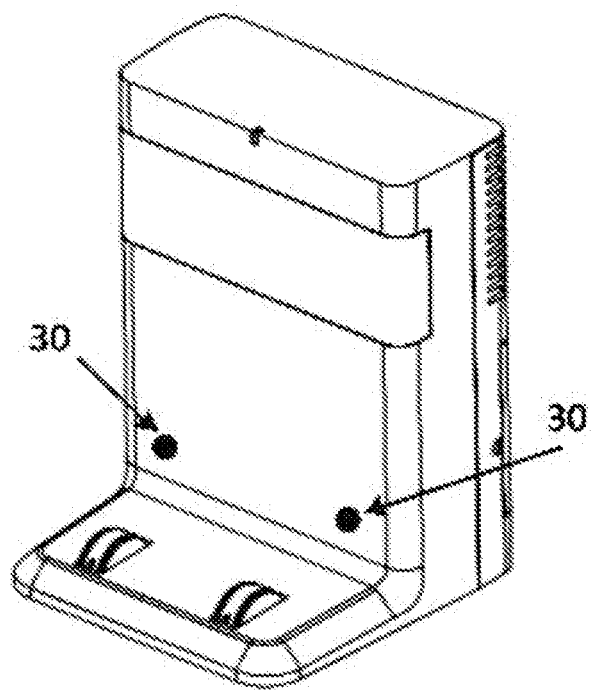
FIG. 3 is a schematic diagram of installation positions of positioning receiving units according to embodiment one of the present disclosure.

The positioning transmitting unit may be disposed on the robot and optionally may be disposed directly in the front of the robot; as shown in FIG. 2, 20 in FIG. 2 denotes the positioning transmitting unit. The positioning receiving units may be disposed at any fixed positions whose position information is known and optionally may be disposed on a charging pile; as specifically shown in FIG. 3, 30 in FIG. 3 denotes a positioning receiving unit.

The method specifically includes the steps described below.

In S110, when the robot is started up, the robot is controlled to rotate in a preset rotation direction in a start-up positioning region.

In the embodiment, when the robot is turned on and started up, the robot will lose its own positioning information and needs to re-determine its own position information by means of an external start-up positioning system. When the start-up position positioning is performed, the robot needs to be placed in a start-up positioning region by a user.

Distances between the start-up positioning region and the positioning receiving units are less than a preset distance threshold. The preset distance threshold is less than transmitting distances of signals of the positioning receiving units, so as to ensure that the positioning transmitting unit on the robot in the start-up positioning region can receive positioning signals sent by the positioning receiving units.

The preset rotation direction may include a clockwise rotation direction and a counterclockwise rotation direction.

In the embodiment, when the robot is restarted up or turned back on, the robot is placed in the start-up positioning region and rotates in the preset rotation direction. In the embodiment, the robot rotates around itself while rotating and keeps itself from moving. In the rotation process of the robot, the positioning transmitting unit disposed on the robot continuously transmits pulse signals to the positioning receiving units disposed at the fixed positions so that distances are measured. During the rotation process of the robot, a relative-position distance set including multiple relative position distances between the positioning transmitting unit and the positioning receiving units can be obtained.

In S120, position information about a rotation path of the positioning transmitting unit is determined according to the preset rotation direction and a set of at least three different position distances, where the at least three different position distances are between the positioning transmitting unit and the two positioning receiving units disposed at the different fixed positions and are determined during a rotation process.

In the embodiment, the positioning receiving units are disposed at the fixed positions, so the position information of the positioning receiving units is known. In the rotation process of the robot, the relative distances between the positioning transmitting unit and the positioning receiving units and the motion trajectory of the positioning transmitting unit in the motion process can be determined according to the calculated set of the relative distances between the positioning transmitting unit and the positioning receiving units. The motion trajectory of the positioning transmitting unit is circular, and the distances between the center of the motion trajectory and the positioning receiving units are the relative distances between the robot and the positioning receiving units. The direction extending from the center to a position of the positioning transmitting unit when the robot stops rotation is the orientation information of the robot. Start-up positioning information of the robot can be obtained according to the orientation information of the robot and the relative distance between the robot and the positioning transmitting unit. The positioning information at start-up of the robot is random and is determined by the placement position of the robot in the start-up positioning region.

In the embodiment, two positioning receiving units 30 disposed on the charging pile are used as an example. Specifically referring to FIGS. 4A to 4C, the rectangular region at the bottom of a figure denotes the charging pile, and the circular region denotes the chassis of the robot. The position of the charging pile is known, so the positions of the two positioning receiving units 30 are also known. The embodiment is illustrated by using an example in which the positioning transmitting unit 20 is directly disposed in the front of the chassis of the robot. The positioning transmitting unit 20 transmits positioning information at a certain frequency. The distances between the positioning transmitting unit 20 and the two positioning receiving units 30 at known positions are continuously measured so that the distances L1 and L2 are obtained. The distance between the two positioning receiving units 30 is determined as L3. Therefore, a triangle with known lengths of the three sides can be determined, and the relative position of the positioning transmitting unit 20 carried by the robot can be further obtained.

Three non-collinear points can determine the equation of a circle, so in the embodiment, the rotation trajectory equation of the robot can be obtained through a selection of a set of at least three different position distances between the positioning transmitting unit 20 and the positioning receiving units 30 and determined during the rotation process of the robot. The preceding three different positions are three points on the motion trajectory of the positioning transmitting unit 20. Assuming that (a, b) is the center coordinates of the circle and r is the radius of the circle formed by rotation, the rotation trajectory equation of the robot can be obtained as $(x-a)^2+(y-b)^2=r^2$.

Further, the robot rotates in situ for one circle. During such process, the positioning transmitting unit 20 continuously transmits pulses, and a set of relative distances between the positioning transmitting unit 20 and the two positioning receiving units 30 can be obtained. The set of distances represents the motion trajectory of the positioning transmitting unit 20 during the rotation process of the robot. According to the motion trajectory, the relative-position relationship between the robot and the positioning receiving units 30 can be determined. That is, the motion trajectory on one side of the charging pile and the motion trajectory on the other side of the charging pile may present a mirror positional relationship. Further, when the rotation direction of the robot is different, the change trends of L1 and L2 in magnitude in the preceding set of relative distances are also different. In the embodiment, the mirror motion trajectory of the positioning transmitting unit 20 is further filtered out according to the preset rotation direction of the robot so as to determine the position information about the motion trajectory of the positioning transmitting unit 20.

Optionally, the step of determining the position information about the rotation path of the positioning transmitting unit 20 according to the preset rotation direction and the set of relative distances, where the relative distances are between the positioning transmitting unit 20 and the two positioning receiving units 30 disposed at the different fixed positions and are acquired during the rotation process, includes: determining a change trend of each relative distance in the set of relative distances between the positioning transmitting unit 20 and the two positioning receiving units 30 disposed at the different fixed positions; and determining the position information about the rotation path of the positioning transmitting unit 20 according to the change trend of each distance and the preset rotation direction.

Optionally, the step of determining the position information about the rotation path of the positioning transmitting unit 20 according to the change trend of each relative distance and the preset rotation direction includes a step described below.

In response to the robot rotating clockwise, and in a process in which a relative distance between the positioning transmitting unit 20 and a first positioning receiving unit changes from a maximum value to a minimum value, a relative distance between the positioning transmitting unit 20 and a second positioning receiving unit has a minimum value, the rotation path of the positioning transmitting unit 20 is located on a right side of a direction extending from the second positioning receiving unit to the first positioning receiving unit. The first positioning receiving unit is located on a left side of the second positioning receiving unit.

Figure 5:
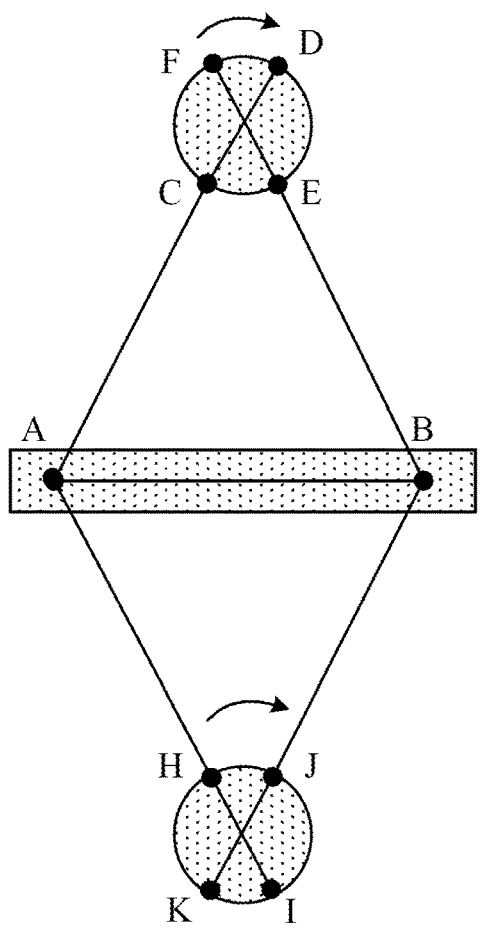
FIG. 5 illustrates change trends of relative distances in a rotation process of a robot according to embodiment one of the present disclosure.

Referring further to FIG. 5, the first positioning receiving unit is at position A, and the second positioning receiving unit is at position B; C-K are different positions of the positioning transmitting unit 20 in the rotation process of the robot, and four straight lines, i.e., C-D, E-F, H-I, and J-K, each pass through the center of one of the two circles. It can thus be obtained that the distance between A and C is the minimum value $L1_{min}$ among the relative distances between the first positioning receiving unit and the positioning transmitting unit 20 during the rotation process of the robot, the distance between A and D is the maximum value $L1_{max}$ among the relative distances between the first positioning receiving unit and the positioning transmitting unit 20 during the rotation process of the robot, the distance between B and E is the minimum value $L2_{min}$ among the relative distances among the second positioning receiving unit and the positioning transmitting unit 20 during the rotation process of the robot, and the distance between B and F is the maximum value $L2_{max}$ among the relative distances between the second positioning receiving unit and the positioning transmitting unit 20 during the rotation process of the robot. When the robot rotates clockwise, and in a process in which a relative distance between the positioning transmitting unit 20 and the first positioning receiving unit changes from a maximum value to a minimum value when the positioning transmitting unit 20 moves from D to C, the relative distance between the positioning transmitting unit 20 and the second positioning receiving unit has the minimum value when the positioning transmitting unit 20 passes through point E. Only when the positioning transmitting unit 20 is located on the right side of the direction extending from the second positioning receiving unit to the first positioning receiving unit can the preceding change trend of each relative distance be satisfied. Therefore, according to the preceding change trend, it can be concluded that the motion trajectory of the positioning transmitting unit 20 is located on the right side of the direction extending from the second positioning receiving unit to the first positioning receiving unit. The first positioning receiving unit is located on the left side of the second positioning receiving unit.

Correspondingly, in response to the robot rotating clockwise, and in a process in which a relative distance between the positioning transmitting unit 20 and a first positioning receiving unit changes from a maximum value to a minimum value, a relative distance between the positioning transmitting unit 20 and a second positioning receiving unit has a maximum value, the rotation path of the positioning transmitting unit 20 is located on a left side of a direction extending from the second positioning receiving unit to the first positioning receiving unit.

In response to the robot rotating counterclockwise, and in a process in which a relative distance between the positioning transmitting unit 20 and a first positioning receiving unit changes from a maximum value to a minimum value, a relative distance between the positioning transmitting unit 20 and a second positioning receiving unit has a maximum value, the rotation path of the positioning transmitting unit 20 is located on a right side of a direction extending from the second positioning receiving unit to the first positioning receiving unit.

In response to the robot rotating counterclockwise, and in a process in which a relative distance between the positioning transmitting unit 20 and a first positioning receiving unit changes from a maximum value to a minimum value, a relative distance between the positioning transmitting unit 20 and a second positioning receiving unit has a minimum value, the rotation path of the positioning transmitting unit 20 is located on a left side of a direction extending from the second positioning receiving unit to the first positioning receiving unit.

In S130, a center position of the rotation path is determined according to the position information about the rotation path of the positioning transmitting unit.

In an optional embodiment, the step of determining the position information about the rotation path of the positioning transmitting unit 20 includes steps described below.

Position coordinates of three non-collinear points on the rotation path are acquired according to a rotation sequence.

An area vector formed by three non-collinear points on each rotation path is determined, and a calculated rotation direction of the robot is obtained according to a numerical value of the area vector; and the position information about the rotation path of the positioning transmitting unit is determined according to the numerical value of the area vector and the preset rotation direction.

Optionally, the step of determining the position information about the rotation path of the positioning transmitting unit according to the numerical value of the area vector and the preset rotation direction includes a step described below.

In response to the robot rotating clockwise, position coordinates of three non-collinear points on each rotation path are acquired according to a rotation sequence, an area vector formed by the three non-collinear points on each rotation path is determined, and a rotation path to which the three non-collinear points belong in a case where the area vector is negative is used as the position information about the rotation path of the positioning transmitting unit 20.

Figure 6:
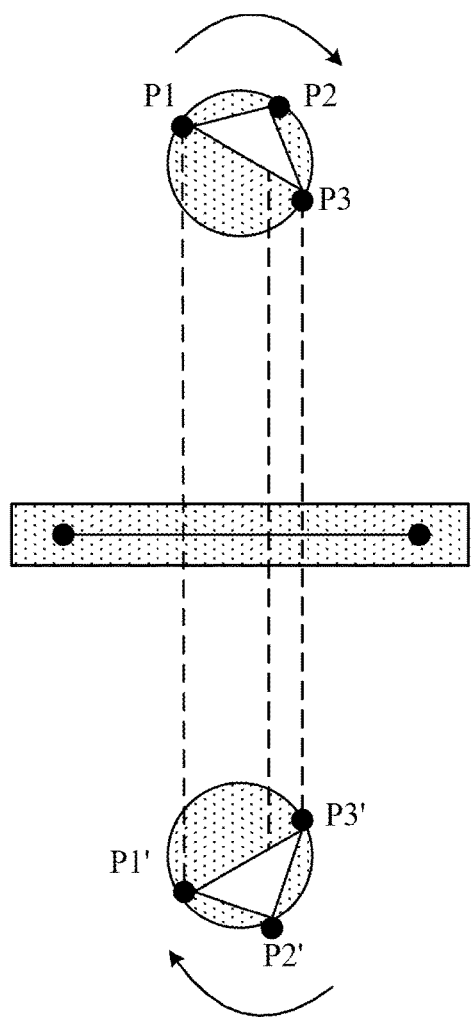
FIG. 6 is a schematic diagram of determination of a rotation path position of a robot according to embodiment one of the present disclosure.

Referring specifically to FIG. 6, two mirror rotation paths of the positioning transmitting unit 20 can be obtained according to the set of relative distances, where the relative distances are between the positioning transmitting unit 20 and the two positioning receiving units 30 disposed at different fixed positions and are determined during the rotation process. If the robot rotates clockwise, position coordinates of three points on each of the two mirror rotation paths are acquired according to a rotation sequence, for example, P1 (x1, y1), P2 (x2, y2), P3 (x3, y3) and P1' (x1', y1'), P2' (x2', y2') and P3' (x3', y3'). The connecting lines of the three points can form a plane triangle. According to the coordinates of the three points, the area vector of the triangle formed by points P1, P2 and P3 can be obtained as follows:

$$S(P1, P2, P3) = \begin{vmatrix} x1 & x2 & x3 \\ y1 & y2 & y3 \\ 1 & 1 & 1 \end{vmatrix} = (x1 - x3)*(y2 - y3) - (y1 - y3)*(x2 - x3).$$

The area vector of the triangle formed by points P1', P2' and P3' is as follows:

$$S'(P1', P2', P3') = \begin{vmatrix} x1' & x2' & x3' \\ y1' & y2' & y3' \\ 1 & 1 & 1 \end{vmatrix} = (x1' - x3')*(y2' - y3') - (y1' - y3')*(x2' - x3').$$

According to the preceding two area vector calculation formulas, the area vector of the triangle formed by the corresponding three points on each of the two rotation paths can be obtained. In the embodiment, when the robot rotates clockwise, the area vector of a triangle formed by three non-collinear points sequentially selected on the rotation path is negative. Therefore, according to the preceding area vector calculation formulas, the rotation path to which the three points belong when the calculated area vector is negative is used as the position information about the rotation path of the positioning transmitting unit 20. Thus, the actual rotation path position of the robot can be determined from the two mirror rotation paths, and the radius of the rotation path can be determined from the coordinates of the three points so that the equation of the rotation path is determined.

Correspondingly, in response to the robot rotating counterclockwise, position coordinates of three non-collinear points on each rotation path are acquired according to a rotation sequence.

An area vector formed by the three non-collinear points on each rotation path is determined, and a rotation path to which the three non-collinear points belong in a case where the area vector is positive is used as the position information about the rotation path of the positioning transmitting unit 20. Optionally, the calculated rotation direction of the robot can be obtained according to whether the area vector is positive or negative, where the area vector is calculated according to coordinates of three different positions obtained in sequence. That is, when the area vector is positive, the rotation direction of the robot is calculated to be counterclockwise; when the area vector is negative, the rotation direction of the robot is calculated to be clockwise. The rotation direction of the robot has been preset, so the position coordinates corresponding to the area vector in the same rotation direction can be obtained according to a comparison between the preset rotation direction of the robot and the area vector. Thus, the positioning information of the robot can be accurately obtained.

In the embodiment, the motion trajectory of the positioning transmitting unit is circular, and the center position of the rotation path, that is, the center position of the circle, can be determined according to the rotation path; the center position is the specific position information of the robot in the start-up positioning region.

In S140, a direction extending from the center position of the rotation path to a position of the positioning transmitting unit when the robot stops rotation is used as orientation information of the robot.

Figure 4A:
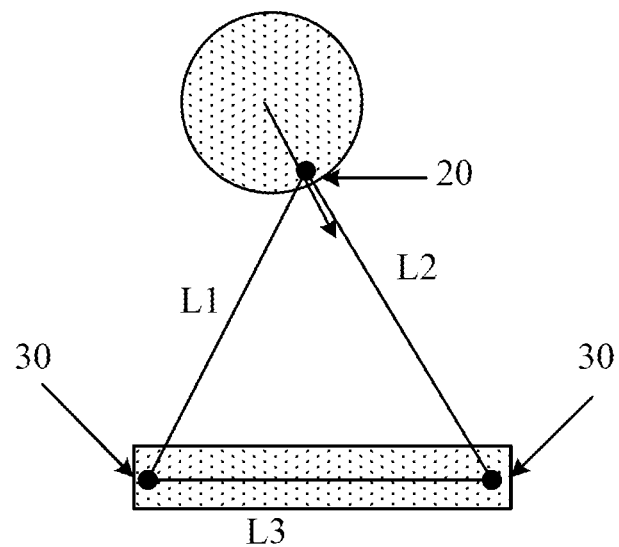
FIGS. 4A to 4C are schematic diagrams of a method for positioning a robot at start-up according to embodiment one of the present disclosure.
Figure 4B:
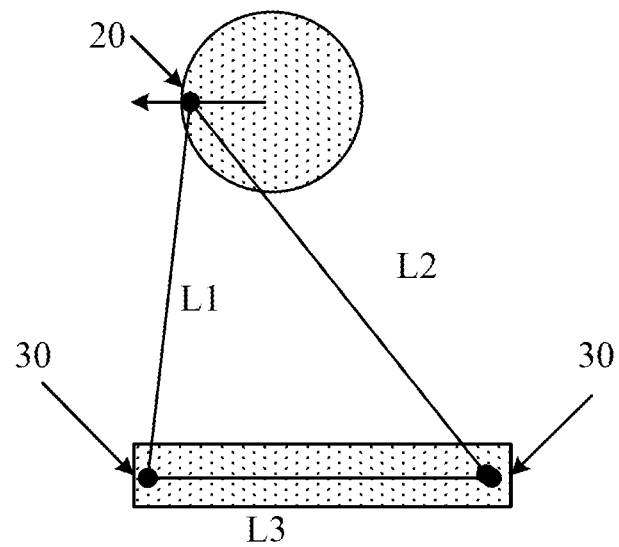
Figure 4C:
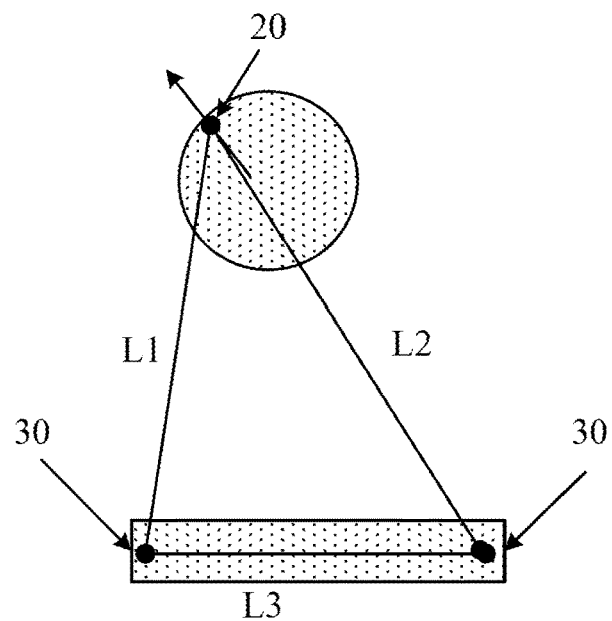

Referring further to FIGS. 4A to 4C, the embodiment is illustrated by using an example in which the positioning transmitting unit 20 is disposed directly in the front of the robot. After the center position of the motion trajectory is determined and when the robot stops after rotation for one cycle, the direction extending from the center position of the rotation path of the robot to the position of the positioning transmitting unit 20 when the robot stops rotation is the orientation information of the robot.

In S150, the center position of the rotation path and the orientation information of the robot are used as start-up positioning information of the robot.

In the embodiment, the center position of the rotation path is the position information of the robot in the start-up positioning region, so the start-up positioning information of the robot can be determined according to the center position of the rotation path and the orientation information of the robot. The robot performs path planning and autonomous navigation according to the positioning information at start-up.

According to the technical solution of the embodiment, position information about a rotation path of the positioning transmitting unit is determined according to the preset rotation direction and a set of relative distances, where the relative distances are between the positioning transmitting unit and the two positioning receiving units and are determined during a rotation process; a direction extending from the center position of the rotation path to a position of the positioning transmitting unit when the robot stops rotation is used as orientation information of the robot; and further the center position of the rotation path and the orientation information of the robot are used as start-up positioning information of the robot. The positioning of the robot at start-up can be achieved merely through two positioning receiving units, saving the cost of the start-up positioning system. Moreover, this method weakens the interference and influence of an obstacle region on environment and improves the accuracy of successful positioning at start-up.

Embodiment Two

Figure 7:
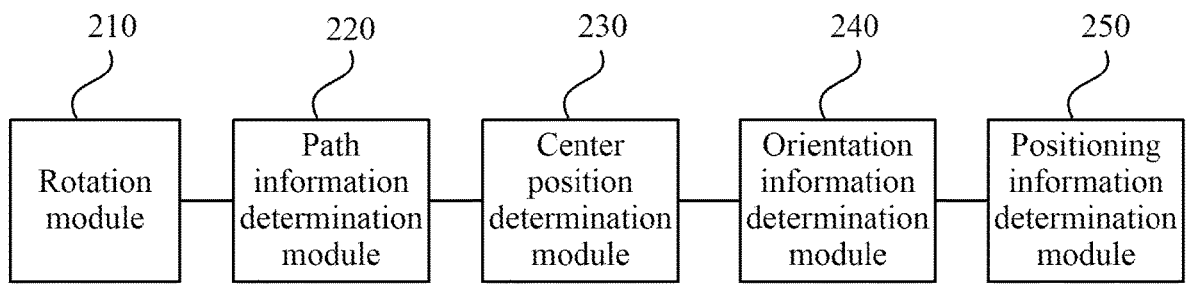
FIG. 7 is a structure diagram of an apparatus for positioning a robot at start-up according to embodiment two of the present disclosure.

FIG. 7 is a structure diagram of an apparatus for positioning a robot at start-up according to embodiment two of the present disclosure. A positioning apparatus at start-up provided in the embodiments of the present disclosure can perform the method for positioning a robot at start-up provided in any embodiment of the present disclosure. The apparatus is configured in a controller of a system for positioning a robot at start-up. The system for positioning a robot at start-up includes two positioning receiving units disposed at different fixed positions and a positioning transmitting unit disposed on the robot. The positioning transmitting unit is in communication connection with the positioning receiving units and is configured to send positioning signals to the positioning receiving units.

Referring to FIG. 7, the apparatus includes a rotation module 210, a path information determination module 220, a center position determination module 230, an orientation information determination module 240 and a positioning information determination module 250.

The rotation module 210 is configured to: when the robot is started up, control the robot to rotate in a preset rotation direction in a start-up positioning region.

The path information determination module 220 is configured to determine position information about a rotation path of the positioning transmitting unit according to the preset rotation direction and a set of at least three different position distances, where the at least three different position distances are between the positioning transmitting unit and the two positioning receiving units disposed at the different fixed positions and are determined during a rotation process.

The center position determination module 230 is configured to determine a center position of the rotation path according to the position information about the rotation path of the positioning transmitting unit.

The orientation information determination module 240 is configured to use a direction extending from the center position of the rotation path to a position of the positioning transmitting unit when the robot stops rotation as orientation information of the robot.

The positioning information determination module 250 is configured to use the center position of the rotation path and the orientation information of the robot as start-up positioning information of the robot.

Optionally, the path information determination module 220 is specifically configured to acquire position coordinates of three non-collinear points on the rotation path according to a rotation sequence; determine an area vector formed by three non-collinear points on each rotation path, and obtain a calculated rotation direction of the robot according to a numerical value of the area vector; and determine the position information about the rotation path of the positioning transmitting unit according to the numerical value of the area vector and the preset rotation direction.

The path information determination module 220 is further specifically configured to: in response to the robot rotating clockwise, acquire position coordinates of three non-collinear points on each rotation path according to a rotation sequence, determine an area vector formed by the three non-collinear points on each rotation path, and use a rotation path to which the three non-collinear points belong in a case where the area vector is negative as the position information about the rotation path of the positioning transmitting unit.

The path information determination module 220 is further specifically configured to: in response to the robot rotating counterclockwise, acquire position coordinates of three non-collinear points on each rotation path according to a rotation sequence, determine an area vector formed by the three non-collinear points on each rotation path, and use a rotation path to which the three non-collinear points belong in a case where the area vector is positive as the position information about the rotation path of the positioning transmitting unit.

Optionally, the path information determination module 220 is specifically configured to: determine a change trend of each relative distance in the set of at least three different relative position distances between the positioning transmitting unit and the two positioning receiving units disposed at the different fixed positions; and determine the position information about the rotation path of the positioning transmitting unit according to the change trend of each relative distance and the preset rotation direction.

The path information determination module 220 is further specifically configured for the following: in response to the robot rotating clockwise, and in a process in which a relative distance between the positioning transmitting unit and a first positioning receiving unit changes from a maximum value to a minimum value, a relative distance between the positioning transmitting unit and a second positioning receiving unit has a minimum value, the rotation path of the positioning transmitting unit is located on a right side of a direction extending from the second positioning receiving unit to the first positioning receiving unit.

The first positioning receiving unit is located on a left side of the second positioning receiving unit.

The path information determination module 220 is further specifically configured for the following: in response to the robot rotating clockwise, and in a process in which a relative distance between the positioning transmitting unit and a first positioning receiving unit changes from a maximum value to a minimum value, a relative distance between the positioning transmitting unit and a second positioning receiving unit has a maximum value, the rotation path of the positioning transmitting unit is located on a left side of a direction extending from the second positioning receiving unit to the first positioning receiving unit, where the first positioning receiving unit is located on a left side of the second positioning receiving unit.

The path information determination module 220 is further specifically configured for the following: in response to the robot rotating counterclockwise, and in a process in which a relative distance between the positioning transmitting unit and a first positioning receiving unit changes from a maximum value to a minimum value, a relative distance between the positioning transmitting unit and a second positioning receiving unit has a maximum value, the rotation path of the positioning transmitting unit is located on a right side of a direction extending from the second positioning receiving unit to the first positioning receiving unit. The first positioning receiving unit is located on a left side of the second positioning receiving unit.

The path information determination module 220 is further specifically configured for the following: in response to the robot rotating counterclockwise, and in a process in which a relative distance between the positioning transmitting unit and a first positioning receiving unit changes from a maximum value to a minimum value, a relative distance between the positioning transmitting unit and a second positioning receiving unit has a minimum value, the rotation path of the positioning transmitting unit is located on a left side of a direction extending from the second positioning receiving unit to the first positioning receiving unit. The first positioning receiving unit is located on a left side of the second positioning receiving unit.

The positioning apparatus at start-up provided in the embodiments of the present disclosure can perform the positioning method at start-up provided in any embodiment of the present disclosure, and has functional modules and beneficial effects corresponding to the execution method. Repetition is not made herein.

Embodiment Three

Figure 8:
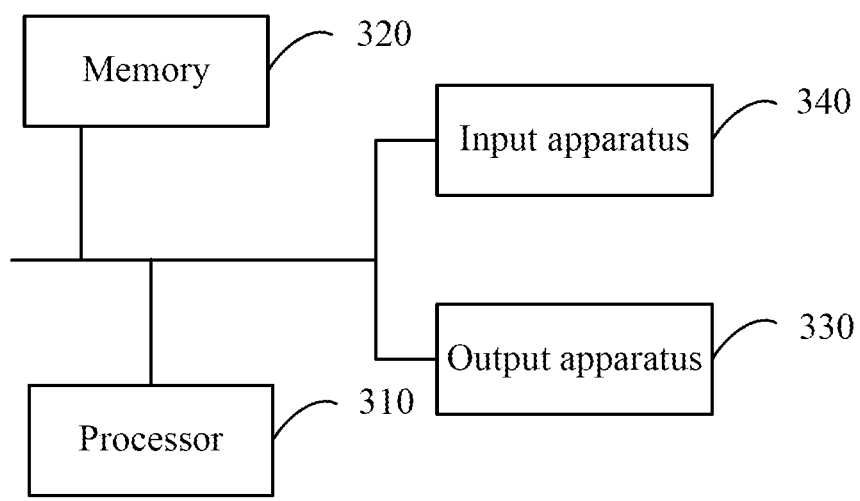
FIG. 8 is a structure diagram of an electronic device according to embodiment three of the present disclosure.

FIG. 8 is a structure diagram of an electronic device according to embodiment three of the present disclosure. As shown in FIG. 8, the electronic device includes a processor 310, a memory 320, an input apparatus 330 and an output apparatus 340. The number of processors 310 in the electronic device may be one or more, and one processor 310 is used as an example in FIG. 8. The processor 310, the memory 320, the input apparatus 330 and the output apparatus 340 in the electronic device may be connected through a bus or in other manners. In FIG. 8, the connection through the bus is used as an example.

The memory 320 as a computer-readable storage medium can be used for storing software programs and computer executable programs and modules, for example, program instructions/modules corresponding to the positioning method at start-up in the embodiments of the present disclosure (for example, the rotation module 310 and the determination module 320 in the positioning apparatus at start-up). The processor 310 executes software programs, instructions and modules stored in the memory 320 to perform various functional applications and data processing of the electronic device, that is, implements the preceding positioning method at start-up.

The memory 320 may mainly include a program storage region and a data storage region. The program storage region may store an operating system and one application required for functions. The data storage region may store data and the like created according to the use of the terminal. In addition, the memory 320 may include a high-speed random access memory, and may also include a nonvolatile memory, such as a disk memory, a flash memory or another nonvolatile solid-state memory. In some examples, the memory 320 may further include memories remotely disposed with respect to the processor 310, and these remote memories may be connected to the electronic device via a network. Examples of the preceding network include, but are not limited to, the Internet, an intranet, a local area network, a mobile communication network and a combination thereof.

The input apparatus 330 may be used for receiving inputted digital or character information and for generating key signal input related to user settings and function control of the electronic device. The output apparatus 340 may include display devices such as a display screen.

Embodiment Four

A storage medium including computer executable instructions is provided in embodiment four of the present disclosure. The computer executable instructions, when executed by a computer processor, are configured for executing a positioning method at start-up. The method is executed by a controller in a system for positioning a robot at start-up. The system for positioning a robot at start-up includes two positioning receiving units disposed at different fixed positions and a positioning transmitting unit disposed on the robot. The positioning transmitting unit is in communication connection with the positioning receiving units and is configured to send positioning signals to the positioning receiving units. The method includes steps described below.

When the robot is started up, the robot is controlled to rotate in a preset rotation direction in a start-up positioning region.

Position information about a rotation path of the positioning transmitting unit is determined according to the preset rotation direction and a set of at least three different position distances, where the at least three different position distances are between the positioning transmitting unit and the two positioning receiving units disposed at the different fixed positions and are determined during a rotation process.

A center position of the rotation path is determined according to the position information about the rotation path of the positioning transmitting unit.

A direction extending from the center position of the rotation path to a position of the positioning transmitting unit when the robot stops rotation is used as orientation information of the robot.

The center position of the rotation path and the orientation information of the robot are used as start-up positioning information of the robot.

In the storage medium including the computer executable instructions provided in the embodiments of the present disclosure, the computer executable instructions may implement not only the preceding method operations but also related operations in the positioning method at start-up provided in any embodiment of the present disclosure.

From the preceding description of embodiments, it will be apparent to those skilled in the art that the present disclosure may be implemented by means of software and necessary general-purpose hardware, or may of course be implemented by hardware, but in many cases the former is a preferred embodiment. Based on this understanding, the technical solution provided in the present disclosure substantially, or the part contributing to the related art, may be embodied in the form of a software product. The software product is stored in a computer-readable storage medium, such as a computer floppy disk, a read-only memory (ROM), a random access memory (RAM), a flash, a hard disk or an optical disk, and includes several instructions for enabling a computer device (which may be a personal computer, a server or a network device) to perform the method in each embodiment of the present disclosure.

It is to be noted that units and modules included in the embodiment of the positioning apparatus at start-up are just divided according to functional logic but are not limited to such division, as long as the corresponding functions can be implemented. In addition, the specific names of the functional units are just used for distinguishing between each other and are not intended to limit the scope of the present disclosure.

It is to be noted that the above are merely preferred embodiments of the present disclosure and the principles used therein. It is to be understood by those skilled in the art that the present disclosure is not limited to the embodiments described herein. Those skilled in the art can make various apparent modifications, adaptations and substitutions without departing from the scope of the present disclosure. Therefore, while the present disclosure has been described in detail through the preceding embodiments, the present disclosure is not limited to the preceding embodiments and may include more other equivalent embodiments without departing from the concept of the present disclosure. The scope of the present disclosure is determined by the scope of the appended claims.

What is claimed is:

1. A method for positioning a robot at start-up, executed by a controller in a system for positioning the robot at start-up, wherein the system for positioning the robot at start-up comprises two positioning receiving units disposed at different fixed positions and a positioning transmitting unit disposed on the robot, the positioning transmitting unit is in communication connection with the positioning receiving units and is configured to send positioning signals to the positioning receiving units, and the method comprises:

when the robot is started up, controlling the robot to rotate in a preset rotation direction in a start-up positioning region;

determining position information about a rotation path of the positioning transmitting unit according to the preset rotation direction and a set of at least three different position distances, wherein the at least three different position distances are between the positioning transmitting unit and the two positioning receiving units and determined during a rotation process;

determining a center position of the rotation path according to the position information about the rotation path of the positioning transmitting unit;

using a direction extending from the center position of the rotation path to a position of the positioning transmitting unit when the robot stops rotation as orientation information of the robot; and using the center position of the rotation path and the orientation information of the robot as start-up positioning information of the robot;

wherein determining the position information about the rotation path of the positioning transmitting unit comprises:

determining two mirror rotation paths of the positioning transmitting unit according to the set of the at least three different position distances;

acquiring position coordinates of three non-collinear points on each of the two mirror rotation paths according to a rotation sequence;

determining an area vector formed by the three non-collinear points on each of the two mirror rotation paths, and obtaining a calculated rotation direction of the robot according to a numerical value of the area vector; and determining the position information about the rotation path of the positioning transmitting unit according to the numerical value of the area vector and the preset rotation direction.

2. The method of claim 1, wherein distances between the start-up positioning region and the positioning receiving units are less than a preset distance threshold.

3. The method of claim 1, wherein determining the position information about the rotation path of the positioning transmitting unit according to the numerical value of the area vector and the preset rotation direction comprises:

in response to the robot rotating clockwise, acquiring position coordinates of three non-collinear points on each rotation path according to a rotation sequence, determining an area vector formed by the three non-collinear points on each rotation path, and using a rotation path to which the three non-collinear points belong in a case where the area vector is negative as the position information about the rotation path of the positioning transmitting unit; or in response to the robot rotating counterclockwise, acquiring position coordinates of three non-collinear points on each rotation path according to a rotation sequence, determining an area vector formed by the three non-collinear points on each rotation path, and using a rotation path to which the three non-collinear points belong in a case where the area vector is positive as the position information about the rotation path of the positioning transmitting unit.

4. The method of claim 1, wherein determining the position information about the rotation path of the positioning transmitting unit according to the preset rotation direction and the set of at least three different position distances, comprises:

determining a change trend of each distance in the set of at least three different position distances between the positioning transmitting unit and the two positioning receiving units disposed at the different fixed positions; and determining the position information about the rotation path of the positioning transmitting unit according to the change trend of each distance and the preset rotation direction.

5. The method of claim 4, wherein determining the position information about the rotation path of the positioning transmitting unit according to the change trend of each distance and the preset rotation direction comprises:

in response to the robot rotating clockwise, and in a process in which a relative distance between the positioning transmitting unit and a first positioning receiving unit changes from a maximum value to a minimum value, a relative distance between the positioning transmitting unit and a second positioning receiving unit has a minimum value, the rotation path of the positioning transmitting unit is located on a right side of a direction extending from the second positioning receiving unit to the first positioning receiving unit; or in response to the robot rotating clockwise, and in a process in which a relative distance between the positioning transmitting unit and a first positioning receiving unit changes from a maximum value to a minimum value, a relative distance between the positioning transmitting unit and a second positioning receiving unit has a maximum value, the rotation path of the positioning transmitting unit is located on a left side of a direction extending from the second positioning receiving unit to the first positioning receiving unit;

wherein the first positioning receiving unit is located on a left side of the second positioning receiving unit.

6. The method of claim 4, wherein determining the position information about the rotation path of the positioning transmitting unit according to the change trend of each distance and the preset rotation direction comprises:

in response to the robot rotating counterclockwise, and in a process in which a relative distance between the positioning transmitting unit and a first positioning receiving unit changes from a maximum value to a minimum value, a relative distance between the positioning transmitting unit and a second positioning receiving unit has a maximum value, the rotation path of the positioning transmitting unit is located on a right side of a direction extending from the second positioning receiving unit to the first positioning receiving unit; or in response to the robot rotating counterclockwise, and in a process in which a relative distance between the positioning transmitting unit and a first positioning receiving unit changes from a maximum value to a minimum value, a relative distance between the positioning transmitting unit and a second positioning receiving unit has a minimum value, the rotation path of the positioning transmitting unit is located on a left side of a direction extending from the second positioning receiving unit to the first positioning receiving unit;

wherein the first positioning receiving unit is located on a left side of the second positioning receiving unit.

7. An electronic device, applied to a system for positioning a robot at start-up, comprising:

at least one processor, wherein the at least one processor serves as a controller in the system for positioning the robot at start-up, the system for positioning the robot at start-up comprises two positioning receiving units disposed at different fixed positions and a positioning transmitting unit disposed on the robot, and the positioning transmitting unit is in communication connection with the positioning receiving units and is configured to send positioning signals to the positioning receiving units; and a storage apparatus, which is configured to store at least one program;

wherein the at least one program, when executed by the at least one processor, causes the at least one processor to implement the following steps:

when the robot is started up, controlling the robot to rotate in a preset rotation direction in a start-up positioning region;

determining position information about a rotation path of the positioning transmitting unit according to the preset rotation direction and a set of at least three different position distances, wherein the at least three different position distances are between the positioning transmitting unit and the two positioning receiving units and determined during a rotation process;

determining a center position of the rotation path according to the position information about the rotation path of the positioning transmitting unit;

using a direction extending from the center position of the rotation path to a position of the positioning transmitting unit when the robot stops rotation as orientation information of the robot; and using the center position of the rotation path and the orientation information of the robot as start-up positioning information of the robot;

wherein the at least one program, when executed by the at least one processor, causes the at least one processor to implement determining the position information about the rotation path of the positioning transmitting unit by:

determining two mirror rotation paths of the positioning transmitting unit according to the set of the at least three different position distances;

acquiring position coordinates of three non-collinear points on each of the two mirror rotation paths according to a rotation sequence;

determining an area vector formed by the three non-collinear points on each of the two mirror rotation paths, and obtaining a calculated rotation direction of the robot according to a numerical value of the area vector; and determining the position information about the rotation path of the positioning transmitting unit according to the numerical value of the area vector and the preset rotation direction.

8. The electronic device of claim 7, wherein distances between the start-up positioning region and the positioning receiving units are less than a preset distance threshold.

9. The electronic device of claim 7, wherein the at least one program, when executed by the at least one processor, causes the at least one processor to implement determining the position information about the rotation path of the positioning transmitting unit according to the numerical value of the area vector and the preset rotation direction by:

in response to the robot rotating clockwise, acquiring position coordinates of three non-collinear points on each rotation path according to a rotation sequence, determining an area vector formed by the three non-collinear points on each rotation path, and using a rotation path to which the three non-collinear points belong in a case where the area vector is negative as the position information about the rotation path of the positioning transmitting unit; or in response to the robot rotating counterclockwise, acquiring position coordinates of three non-collinear points on each rotation path according to a rotation sequence, determining an area vector formed by the three non-collinear points on each rotation path, and using a rotation path to which the three non-collinear points belong in a case where the area vector is positive as the position information about the rotation path of the positioning transmitting unit.

10. The electronic device of claim 7, wherein the at least one program, when executed by the at least one processor, causes the at least one processor to implement determining the position information about the rotation path of the positioning transmitting unit according to the preset rotation direction and the set of at least three different position distances by:

determining a change trend of each distance in the set of at least three different position distances between the positioning transmitting unit and the two positioning receiving units disposed at the different fixed positions; and determining the position information about the rotation path of the positioning transmitting unit according to the change trend of each distance and the preset rotation direction.

11. The electronic device of claim 10, wherein the at least one program, when executed by the at least one processor, causes the at least one processor to implement determining the position information about the rotation path of the positioning transmitting unit according to the change trend of each distance and the preset rotation direction by:

in response to the robot rotating clockwise, and in a process in which a relative distance between the positioning transmitting unit and a first positioning receiving unit changes from a maximum value to a minimum value, a relative distance between the positioning transmitting unit and a second positioning receiving unit has a minimum value, the rotation path of the positioning transmitting unit is located on a right side of a direction extending from the second positioning receiving unit to the first positioning receiving unit; or in response to the robot rotating clockwise, and in a process in which a relative distance between the positioning transmitting unit and a first positioning receiving unit changes from a maximum value to a minimum value, a relative distance between the positioning transmitting unit and a second positioning receiving unit has a maximum value, the rotation path of the positioning transmitting unit is located on a left side of a direction extending from the second positioning receiving unit to the first positioning receiving unit;

wherein the first positioning receiving unit is located on a left side of the second positioning receiving unit.

12. The electronic device of claim 10, wherein the at least one program, when executed by the at least one processor, causes the at least one processor to implement determining the position information about the rotation path of the positioning transmitting unit according to the change trend of each distance and the preset rotation direction by:

in response to the robot rotating counterclockwise, and in a process in which a relative distance between the positioning transmitting unit and a first positioning receiving unit changes from a maximum value to a minimum value, a relative distance between the positioning transmitting unit and a second positioning receiving unit has a maximum value, the rotation path of the positioning transmitting unit is located on a right side of a direction extending from the second positioning receiving unit to the first positioning receiving unit; or in response to the robot rotating counterclockwise, and in a process in which a relative distance between the positioning transmitting unit and a first positioning receiving unit changes from a maximum value to a minimum value, a relative distance between the positioning transmitting unit and a second positioning receiving unit has a minimum value, the rotation path of the positioning transmitting unit is located on a left side of a direction extending from the second positioning receiving unit to the first positioning receiving unit;

wherein the first positioning receiving unit is located on a left side of the second positioning receiving unit.

13. A non-transitory computer-readable storage medium, having a computer program stored thereon and applied to a system for positioning a robot at start-up, wherein the program is executable by a processer;

wherein the processor serves as a controller in the system for positioning the robot at start-up, the system for positioning the robot at start-up comprises two positioning receiving units disposed at different fixed positions and a positioning transmitting unit disposed on the robot, and the positioning transmitting unit is in communication connection with the positioning receiving units and is configured to send positioning signals to the positioning receiving units; and wherein the program is configured to, when executed by the processor, cause the processor to perform the following steps:

when the robot is started up, controlling the robot to rotate in a preset rotation direction in a start-up positioning region;

determining position information about a rotation path of the positioning transmitting unit according to the preset rotation direction and a set of at least three different position distances, wherein the at least three different position distances are between the positioning transmitting unit and the two positioning receiving units and determined during a rotation process;

determining a center position of the rotation path according to the position information about the rotation path of the positioning transmitting unit;

using a direction extending from the center position of the rotation path to a position of the positioning transmitting unit when the robot stops rotation as orientation information of the robot; and using the center position of the rotation path and the orientation information of the robot as start-up positioning information of the robot;

wherein the program is configured to, when executed by the processor, cause the processor to perform determining the position information about the rotation path of the positioning transmitting unit by:

determining two mirror rotation paths of the positioning transmitting unit according to the set of the at least three different position distances;

acquiring position coordinates of three non-collinear points on each of the two mirror rotation paths according to a rotation sequence;

determining an area vector formed by the three non-collinear points on each of the two mirror rotation paths, and obtaining a calculated rotation direction of the robot according to a numerical value of the area vector; and determining the position information about the rotation path of the positioning transmitting unit according to the numerical value of the area vector and the preset rotation direction.

14. The storage medium of claim 13, wherein distances between the start-up positioning region and the positioning receiving units are less than a preset distance threshold.

15. The storage medium of claim 13, wherein the program is configured to, when executed by the processor, cause the processor to perform determining the position information about the rotation path of the positioning transmitting unit according to the numerical value of the area vector and the preset rotation direction by:

in response to the robot rotating clockwise, acquiring position coordinates of three non-collinear points on each rotation path according to a rotation sequence, determining an area vector formed by the three non-collinear points on each rotation path, and using a rotation path to which the three non-collinear points belong in a case where the area vector is negative as the position information about the rotation path of the positioning transmitting unit; or in response to the robot rotating counterclockwise, acquiring position coordinates of three non-collinear points on each rotation path according to a rotation sequence, determining an area vector formed by the three non-collinear points on each rotation path, and using a rotation path to which the three non-collinear points belong in a case where the area vector is positive as the position information about the rotation path of the positioning transmitting unit.

16. The storage medium of claim 13, wherein the program is configured to, when executed by the processor, cause the processor to perform determining the position information about the rotation path of the positioning transmitting unit according to the preset rotation direction and the set of at least three different position distances by:

determining a change trend of each distance in the set of at least three different position distances between the positioning transmitting unit and the two positioning receiving units disposed at the different fixed positions; and determining the position information about the rotation path of the positioning transmitting unit according to the change trend of each distance and the preset rotation direction.

17. The storage medium of claim 16, wherein the program is configured to, when executed by the processor, cause the processor to perform determining the position information about the rotation path of the positioning transmitting unit according to the change trend of each distance and the preset rotation direction by:

in response to the robot rotating clockwise, and in a process in which a relative distance between the positioning transmitting unit and a first positioning receiving unit changes from a maximum value to a minimum value, a relative distance between the positioning transmitting unit and a second positioning receiving unit has a minimum value, the rotation path of the positioning transmitting unit is located on a right side of a direction extending from the second positioning receiving unit to the first positioning receiving unit; or in response to the robot rotating clockwise, and in a process in which a relative distance between the positioning transmitting unit and a first positioning receiving unit changes from a maximum value to a minimum value, a relative distance between the positioning transmitting unit and a second positioning receiving unit has a maximum value, the rotation path of the positioning transmitting unit is located on a left side of a direction extending from the second positioning receiving unit to the first positioning receiving unit;

wherein the first positioning receiving unit is located on a left side of the second positioning receiving unit.

* * * * *